(12) United States Patent
Krenz et al.

(10) Patent No.: US 8,099,202 B1
(45) Date of Patent: Jan. 17, 2012

(54) SYSTEM AND METHOD FOR PROVIDING A FINAL APPROACH CURTAIN

(75) Inventors: Michael J. Krenz, Cedar Rapids, IA (US); Pamela K. Hahn, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 868 days.

(21) Appl. No.: 12/156,968

(22) Filed: Jun. 6, 2008

(51) Int. Cl.
*G06G 7/78* (2006.01)
*G06F 19/00* (2011.01)

(52) U.S. Cl. .......................... 701/16; 701/14; 701/211

(58) Field of Classification Search .................. 701/211, 701/14, 16; 340/973–975; 715/771
See application file for complete search history.

(56) References Cited

U.S. PATENT DOCUMENTS

| | | | |
|---|---|---|---|
| 7,216,069 B2 * | 5/2007 | Hett | 703/6 |
| 2003/0132860 A1 * | 7/2003 | Feyereisen et al. | 340/973 |
| 2005/0007386 A1 * | 1/2005 | Berson et al. | 345/633 |
| 2009/0121901 A1 * | 5/2009 | Namier et al. | 340/975 |
| 2009/0265088 A1 * | 10/2009 | Dias et al. | 701/120 |

* cited by examiner

*Primary Examiner* — Luke Gilligan
(74) *Attorney, Agent, or Firm* — Donna P. Suchy; Daniel M. Barbieri (57) ABSTRACT

The present invention is a method for providing a depiction of an approach path to a landing area and of terrain proximal to the landing area via a flight deck situational awareness system of an aircraft. The method may include providing a vertical reference graphical indicator for indicating a glide path for the landing area. The method may further include providing a plurality of extended graphical indicators which extend from the vertical reference graphical indicator and intercept the depicted terrain. The method may further include connecting the plurality of extended graphical indicators via a horizontal reference graphical indicator which forms an extension of a centerline of the landing area onto the depicted terrain. The vertical reference graphical indicator, the extended graphical indicators, and the horizontal reference graphical indicator may form boundaries of a plurality of transparent panes, which collectively form a transparent approach curtain.

17 Claims, 4 Drawing Sheets

SYSTEM AND METHOD FOR PROVIDING A FINAL APPROACH CURTAIN

FIELD OF THE INVENTION

The present invention relates to the field of flight deck situational awareness systems, such as Synthetic Vision Systems (SVS) or Enhanced Vision Systems (EVS) and particularly to a system and method for displaying a final approach curtain for an aircraft.

BACKGROUND OF THE INVENTION

When landing an aircraft, a pilot of the aircraft is typically required to direct the aircraft along a desired final approach path for promoting safe landing of the aircraft. Currently available flight deck situational awareness systems may not be as useful as desired for helping the pilot to either maintain or direct the aircraft along the desired final approach path.

Thus, it would be desirable to provide a system or method which promotes increased utility for facilitating a pilot in maintaining/directing an aircraft along a desired final approach path.

SUMMARY OF THE INVENTION

Accordingly, an embodiment of the present invention is directed to a flight deck situational awareness system for displaying a depiction of an approach path to a landing area and of terrain proximal to the landing area for an aircraft, the system including: a memory configured for storing aircraft navigation information for the aircraft; a processor configured for being communicatively coupled with the memory and further configured for receiving the aircraft navigation information stored in the memory, the processor being further configured for generating the depiction based upon the aircraft navigation information; and a display configured for being communicatively coupled with the processor, the display being further configured for receiving the depiction from the processor and for displaying the depiction, wherein the depiction includes an approach curtain when the aircraft is located beyond a threshold intercept angle for intercepting the approach path.

An additional embodiment of the present invention is directed to a method for providing a depiction of an approach path to a landing area and of terrain proximal to the landing area, the depiction being provided via a flight deck situational awareness system of an aircraft, including: providing a vertical reference graphical indicator, the vertical reference graphical indicator indicating a glide path for the landing area; providing a plurality of extended graphical indicators, the plurality of extended graphical indicators extending from the vertical reference graphical indicator and intercepting the depicted terrain; and connecting the plurality of extended graphical indicators via a horizontal reference graphical indicator, the horizontal reference graphical indicator forming an extension of a centerline of the landing area, the horizontal reference graphical indicator extending from the landing area and being overlaid onto the depicted terrain, wherein the vertical reference graphical indicator, the plurality of extended graphical indicators, and the horizontal reference graphical indicator form boundaries of a plurality of transparent panes, the plurality of transparent panes collectively forming a transparent approach curtain.

A further embodiment of the present invention is directed to a computer-readable medium having computer-executable instructions for performing a method for providing a depiction of an approach path to a landing area and of terrain proximal to the landing area, the depiction being provided via a flight deck situational awareness system of an aircraft, said method including: providing a vertical reference graphical indicator, the vertical reference graphical indicator indicating a glide path for the landing area; providing a plurality of extended graphical indicators, the plurality of extended graphical indicators extending from the vertical reference graphical indicator and intercepting the depicted terrain; and connecting the plurality of extended graphical indicators via a horizontal reference graphical indicator, the horizontal reference graphical indicator forming an extension of a centerline of the landing area, the horizontal reference graphical indicator extending from the landing area and being overlaid onto the depicted terrain, wherein the vertical reference graphical indicator, the plurality of extended graphical indicators, and the horizontal reference graphical indicator form boundaries of a plurality of transparent panes, the plurality of transparent panes collectively forming a transparent approach curtain.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

When landing an aircraft, a pilot of the aircraft is typically required to direct the aircraft along a desired final approach path for promoting safe landing of the aircraft. The desired final approach path may include a lateral/horizontal element and a vertical element (ex. —glide slope element or glide path element). Further, the desired final approach path is typically a path which, if navigated by the aircraft during final approach, will direct the aircraft safely onto a landing area, such as an airport runway. The lateral element is the width (distance along a horizontal axis) of the pathway, and may include a left boundary, a right boundary and a center point. For example, the center point of the lateral element may correspond to the centerline/median of the runway, while the left boundary and the right boundary may correspond with the left and right edges of the runway. The vertical/glide slope element may be a recommended/desired angle or range of angles (ex. —three (3) degrees relative to horizontal/ground level/the runway) at which the aircraft may approach the runway during final approach for promoting safe landing of the aircraft on the runway. For instance, if the aircraft is navigated along the desired glide slope element and is also navigated along the desired lateral element (ex. —within the left, right boundaries) during final approach, the aircraft will be navigating along the desired final approach path, which may promote a safe landing on the runway for the aircraft.

During final approach, in order to navigate or direct the aircraft onto the desired final approach path and/or to maintain the aircraft along the desired final approach path, it may be useful for a pilot or flight crew member of the aircraft to be able to accurately and easily ascertain and monitor a current position of the aircraft relative to the desired final approach path at various points in time. Current/updated positional information for an aircraft may be provided by flight deck situational awareness systems, such as Synthetic Vision Systems (SVS) or Enhanced Vision Systems (EVS). However, determining the current aircraft position relative to the desired final approach path may be challenging when implementing SVS. For example, Highway in the Sky (HITS) techniques may promote a pilot's ability to maintain the aircraft along a desired final approach path once the aircraft has already been navigated onto the desired final approach path. However, said HITS techniques may not be particularly useful in promoting a pilot's ability to easily locate the desired final approach path and to easily direct the aircraft onto or cause the aircraft to intercept the desired final approach path. Some SVS implementations, which may provide for the display of extended centerlines of a runway (ex. —said centerlines are overlaid onto a depiction of the ground/terrain), may assist a pilot/flight crew member in directing the aircraft inside of/maintaining the aircraft within the boundaries for the lateral element of the desired final approach path. However, such SVS implementations may not be very useful in helping a pilot to ascertain a current position of the aircraft relative to the vertical/glide slope element (ex. —a nominal glide path) of the desired final approach path.

A general objective of a flight crew member/pilot is to direct an aircraft onto a lateral element of a desired final approach path/navigate the aircraft so that it intercepts a lateral element of a desired final approach path by moving/flying in a generally horizontal direction (ex. —the aircraft intercepts the lateral element of the desired final approach path by moving/flying from left to right or from right to left). A further general objective of the flight crew member/pilot is to direct the aircraft onto a vertical or glide slope element of a desired final approach path/navigate the aircraft so that it intercepts a vertical or glide slope element of a desired final approach path by moving/flying in a generally vertical direction (ex. —the aircraft intercepts the vertical element of the desired final approach path by flying from a lower altitude to a higher altitude). Runways implementing only visual approach slope indicators for assisting a pilot in determining the aircraft's current position relative to glide slope (ex. —relative to a vertical element of the desired final approach path; whether the aircraft is flying too high or too low to safely land on the runway) during final approach may be particularly problematic in that said indicators are generally not visible until the aircraft is within a certain proximity of the runway (ex. —within a 15 degree angle) to the left or the right with respect to the extended runway centerline. Consequently, in such a scenario, a pilot may not be able to determine the aircraft's current position relative to the desired vertical element/glide slope, unless the aircraft is already on the desired final approach path.

Figure 1:
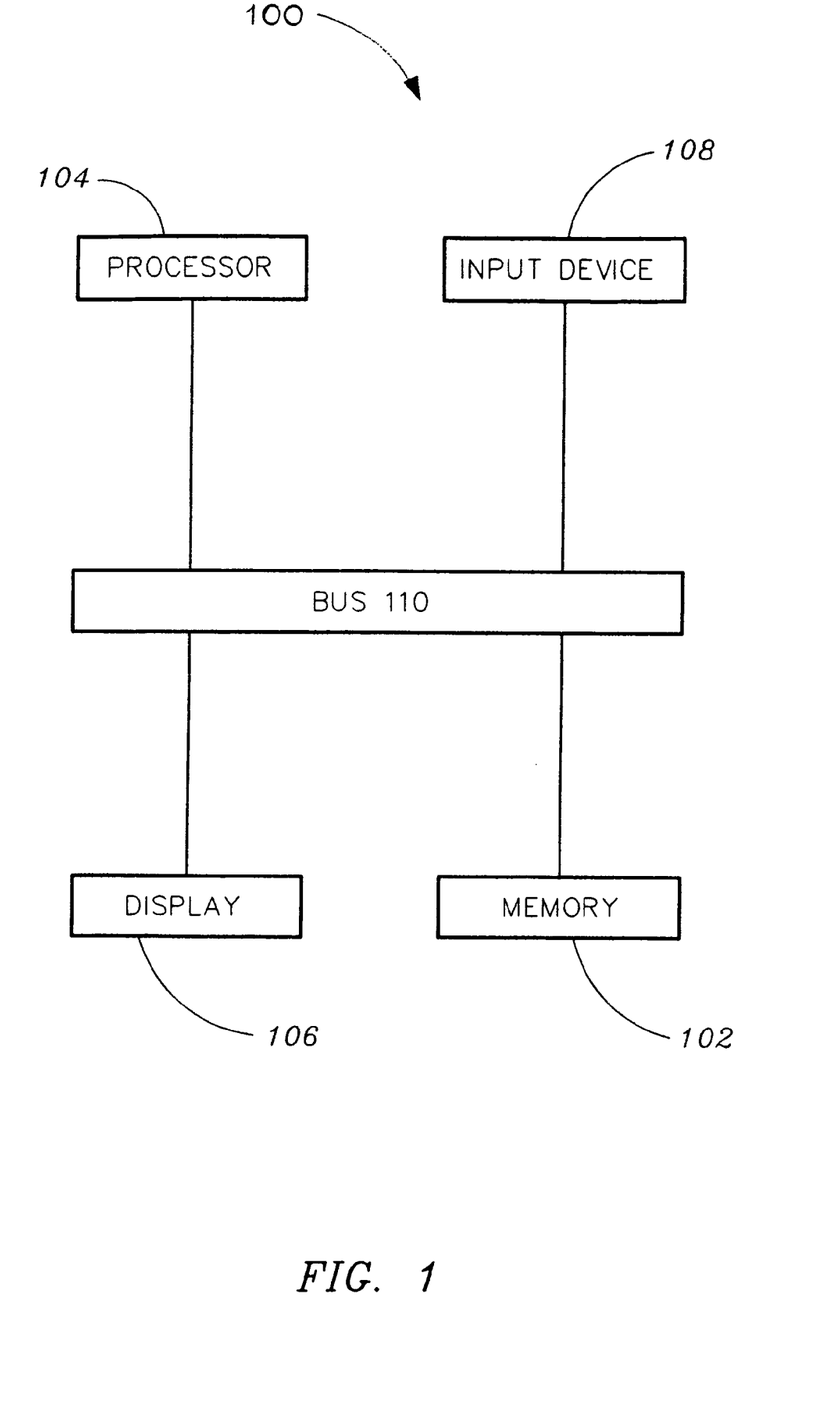
FIG. 1 is a block diagram schematic of a flight deck situational awareness system for displaying a depiction of an approach path to a landing area and of terrain proximal to the landing area for an aircraft in accordance with an exemplary embodiment of the present invention.
Figure 2:
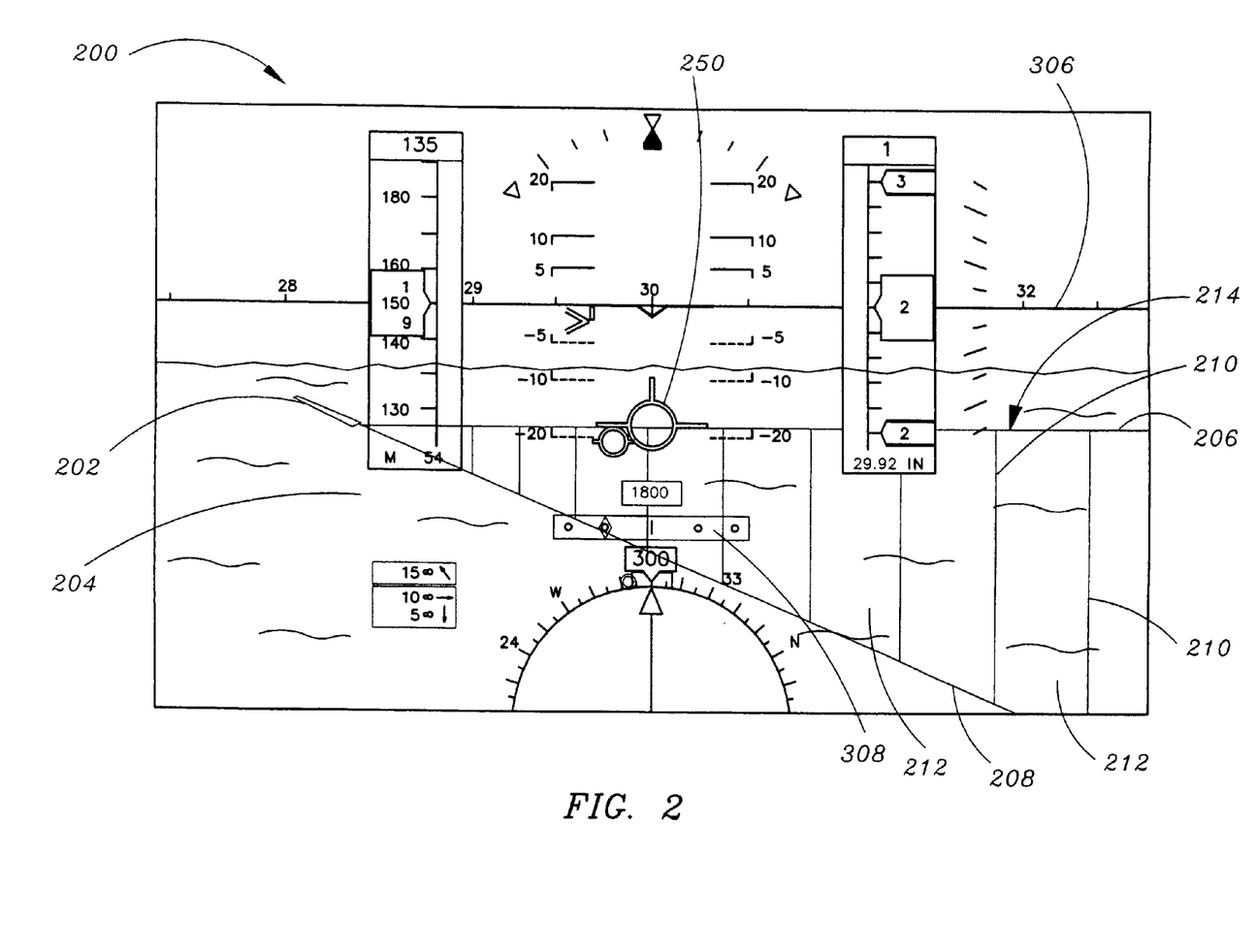
FIG. 2 is a screen shot of a depiction which may be displayed via a display of the system of the present invention, said screenshot depicting: a vertical reference graphical indicator for indicating a glide path for the landing area; a plurality of extended graphical indicators, and a horizontal reference graphical indicator for forming an extension of a centerline of the landing area, the vertical reference graphical indicator, the plurality of extended graphical indicators, and the horizontal reference graphical indicator forming boundaries of a plurality of transparent panes which collectively form a transparent approach curtain.
Figure 3:
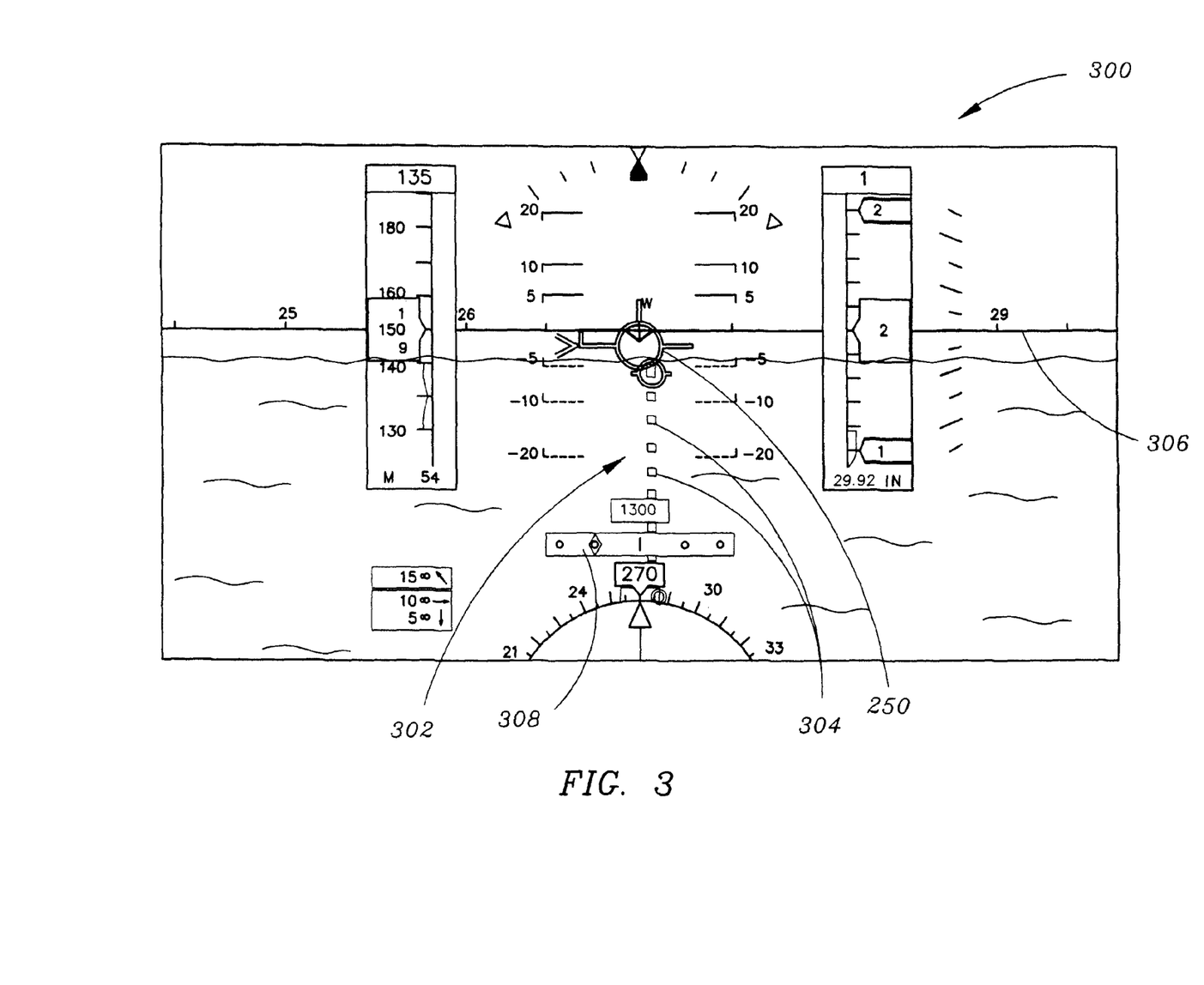
FIG. 3 is a screen shot of a depiction which may be displayed via the display of the system of the present invention when an aircraft implementing the system is located within a threshold intercept angle for intercepting an approach path, said screenshot depicting: a centerline awareness trail, the centerline awareness trail including a plurality of markers, each marker corresponding to an extended graphical indicator-terrain intercept location.

Referring generally to FIGS. 1-3, a flight deck situational awareness system for displaying a depiction of an approach path to a landing area and of terrain proximal to the landing area for an aircraft in accordance with exemplary embodiments of the present invention will be discussed. In FIG. 1, a block diagram schematic of a flight deck situational awareness system for displaying a depiction of an approach path (ex. —an Instrument Landing System (ILS) approach path) to a landing area and of terrain proximal to the landing area for an aircraft in accordance with an exemplary embodiment of the present invention is shown. In an exemplary embodiment, the system 100 may be a Synthetic Vision System (SVS) or an Enhanced Vision System (EVS) (ex. —the system may implement SVS or EVS technology). In the illustrated embodiment, the system 100 includes a memory 102. The memory 102 may be configured for storing various aircraft navigation information for the aircraft, such as: positional information for the aircraft (ex. —a current location of the aircraft); performance information for the aircraft (ex. —a current speed of the aircraft, a current acceleration of the aircraft, current aircraft loading information, a current aircraft weight, and/or various performance characteristics of the aircraft); navigational environment information for the aircraft (ex. —a current wind speed in a vicinity of the aircraft, a current wind direction of wind in the vicinity of the aircraft); approach path information (ex. —prescribed glide path/glide slope information/data for various runways/approaches/approach paths, or the like); landing area information (ex. —runway location/runway dimension information/data, runway ID data/information, prescribed); and terrain information (ex. —information/data regarding terrain/obstacle locations and characteristics). For instance, the memory 102 may include one or more databases which may include the above-referenced data/information.

In exemplary embodiments, the memory 102 of the system 100 may be configured for dynamically receiving and updating one or more of the above-mentioned types of data/information in real time (ex. —via inputs to the memory 102, said inputs provided by one or more input devices 108, such as aircraft sensors, antennas, Global Positioning System (GPS) devices, Inertial Reference System devices, or, the like which may be communicatively coupled to the memory).

In the illustrated embodiment, the system 100 further includes a processor 104. The processor 104 is configured for being communicatively coupled with the memory 102 and is further configured for receiving the above-referenced information/data which may be stored in the memory 102. The processor 104 may be further configured for generating depiction(s)/images based upon the received information/data.

In further embodiments, the system 100 may include a display 106. The display 106 may be configured for being communicatively coupled with the processor 104. The display 106 may be further configured for receiving the depiction(s) (ex. —shown in FIGS. 2 and 3) which is/are output to the display 106 from the processor 104. The display 106 may be further configured for displaying the depiction/screenshot 200. For instance, the depiction may be a Synthetic Vision System (SVS) depiction or an Enhanced Vision System (EVS) depiction (ex. —the system 100 may be/may include/may be implemented with an SVS or an EVS). In additional embodiments, information/data stored in the memory 102 may include information provided by a pilot/flight crew member via the input device(s) (ex. —via a keyboard). In further embodiments, the display 106 may be communicatively coupled with the memory 102, such that pilot/flight crew member-provided information may be provided to the memory 102 via a display input mechanism of the display 106, such as via a touch screen of the display 106. Still further, one or more of the memory 102, the processor 104, the display 106, and the input devices 108 may be communicatively coupled via a bus 110.

In exemplary embodiments, the depiction 200, which may be displayed via the display 106, is shown in FIG. 2, and may include an approach path, such as a final approach path to a landing area 202 (ex. —a runway) and may also include terrain 204 (ex. —land, water) or obstacles (ex. —man-made structures) in the vicinity of/proximal to the aircraft and/or the landing area 202. The approach path may include a vertical element and a lateral/horizontal element. In a current embodiment of the present invention, the vertical element may be represented by a vertical reference graphical indicator 206. The vertical reference graphical indicator 206 may indicate/correspond to a glide path or glide slope for the landing area 202. For instance, the glide path/glide slope may be defined as a proper, nominal and/or prescribed path/angle of descent an aircraft should take when preparing to land on a particular landing area/runway, such as three degrees above a horizontal/ground plane (ex. —at a three degree angle above the horizontal plane defined by the runway). As in the illustrated embodiment (FIG. 2), the vertical reference graphical indicator 206 may be a solid line which originates at the landing area/runway 202 (ex. —at a landing zone of the runway) and extends above the horizontal/ground plane (ex. —the horizontal plane generally defined by the runway 202) at an angle/slope/arc in such a manner as to be representative/indicative of the glide path (ex. —the prescribed glide path the aircraft should navigate during final approach to that landing area/runway 202).

As mentioned above, the depicted approach path may include a lateral/horizontal element. In a current embodiment of the present invention, the lateral/horizontal element may be represented by a horizontal reference graphical indicator 208. The horizontal reference graphical indicator 208 may indicate/correspond to an extended centerline of the landing area 202. As in the illustrated embodiment (FIG. 2), the horizontal reference graphical indicator 208 may be a solid line which originates at the landing area/runway 202 (ex. —at the landing zone of the runway) and extends/overlays onto the depicted terrain 204, thereby forming an extension (ex. —a straight line extension) of the centerline of the landing area 202.

In a current embodiment of the present invention, the depiction 200 may further include a plurality of extended graphical indicators 210. The plurality of extended graphical indicators 210 may extend from the vertical reference graphical indicator 206 along a vertical axis and may intercept the depicted terrain 204 at a plurality of intercept locations (ex. —extended graphical indicator-terrain interception locations). In exemplary embodiments, each of the plurality of intercept locations (as well as terrain-intercepting portions of each of the extended graphical indicators 210) may be located on/aligned with/connected by the horizontal reference graphical indicator 208. In further embodiments, the intercept locations/terrain-intercepting portions of the extended graphical indicators 210 may be located on/aligned with/connected by the horizontal reference graphical indicator 208, such that said intercept locations/terrain-intercepting portions of the extended graphical indicators 210 are spaced/periodically located on the horizontal reference graphical indicator 208. In additional embodiments, each of the extended graphical indicators 210 may be solid lines which extend between/connect the vertical reference graphical indicator 206 and the horizontal reference graphical indicator 208/the depicted terrain 204.

In exemplary embodiments of the present invention, the vertical reference graphical indicator 206, the extended graphical indicators 210, and the horizontal reference indicator 208 may form boundaries of a plurality of panes or windows 212. Collectively, the panes/windows 212 may form an approach curtain 214 (ex. —a final approach curtain). In further embodiments, the panes/windows 212 may be transparent and/or translucent, thereby collectively forming a transparent and/or translucent approach curtain 214. The transparent approach curtain 214 may provide a graphical indication of the location/characteristics of the final approach path and may provide a graphical indication as to how close the aircraft is to intercepting the final approach path.

In additional embodiments, the transparent approach curtain 214 may appear/be included in the depiction 200 when the aircraft is located/is navigating at or beyond/outside of a threshold intercept angle for intercepting the approach path. For example, the threshold value for an intercept angle for intercepting the approach path (ex. —an ILS approach path) may be a value between approximately 5 and 30 degrees, such as 10 degrees. Thus, when the aircraft is located at or beyond this threshold value for the intercept angle (i.e., at or beyond the threshold intercept angle) with respect to the approach/approach path, the approach curtain 214 (ex. —appearing as a side view of the approach curtain, as shown in FIG. 2) may be included in the depiction. Thus, the depiction 200, including the approach curtain 214, may provide a graphical indication/depiction of the approach path (ex. —an indication/depiction of a desired/prescribed approach path), a graphical indication/depiction of the aircraft's proximity to the approach path (ex. —an indication/depiction which provides information regarding the aircraft's current position relative to the approach path and/or allows a pilot or flight crew member to determine the aircraft's current position relative to the approach path), and/or a graphical indication/depiction which provides information regarding the aircraft's proximity to intercepting the approach path. and/or allows a pilot or flight crew member to determine/ascertain the aircraft's proximity to intercepting the approach path.

In further embodiments, the depiction 200, including the approach curtain 214, may promote improved ability of a pilot or flight crew member to: more easily navigate the aircraft so that said aircraft more easily intercepts the approach path; more easily determine the aircraft's relative position to the desired (ex. —nominal) glide path and to the centerline of the runway; and/or to more easily navigate the aircraft to align with/remain aligned with the desired glide path and the centerline of the landing area/runway 202 during final approach.

In additional embodiments, when one or more portions of the vertical reference graphical indicator 206 intercept the depicted terrain 204 or obstacles, said portions of the vertical reference graphical indicator 206 may be represented in the depiction 200 so as to provide a visual indication (ex. —may be represented by/depicted as dashed or broken lines) of said interception of the terrain/obstacles 204. In alternative embodiments, the vertical reference graphical indicator 206, the horizontal reference graphical indicator 208, and/or the extended graphical indicators 210 may be depicted as dashed lines, broken lines, dotted lines, arrows, bars, or other various designs. In further embodiments, the landing area 202, the terrain 204/obstacles, the vertical reference graphical indicator 206, the horizontal reference graphical indicator 208, and/or the extended graphical indicators 210 may be depicted in different colors or as having different line thickness, dimensions, shapes, designs/patterns, may be accompanied with text captioning, or the like, for making them more easily distinguishable from one another in the depiction As mentioned above, the processor 104 may be configured for dynamically updating the depiction (ex. —in real time) based upon updated data received from the memory 102 and is further configured providing the updated depiction (ex. —a second depiction) to the display 106. The display 106 may be configured for receiving the updated depiction and displaying the updated depiction, the updated depiction 300 being shown in FIG. 3 in accordance with an exemplary embodiment of the present invention. The updated depiction 300 shown in FIG. 3 is an example of an updated depiction 300 which may be provided when the aircraft is located/has navigated/is navigating such that it is at or within the threshold intercept angle. For example, as described above, the value of the threshold intercept angle may be ten degrees and when the aircraft is located at or within this value, an updated depiction 300 as shown in FIG. 3. In the updated depiction 300, the vertical reference graphical indicator 206, the horizontal reference graphical indicator 208, the extended graphical indicators 210, the panes 212, and the final approach curtain 214 are no longer depicted. However, the updated depiction 300 includes a centerline awareness trail 302, which may replace the above-referenced indicators, the centerline awareness trail 302 including a plurality of markers 304 (ex. —dots), the markers 304 corresponding to/marking the previously described extended graphical indicator-terrain intercept locations, thereby providing awareness of the location of the centerline/extended centerline of the landing area 202 relative to a current location of the aircraft. In further embodiments, a vertical deviation indicator 306 for providing awareness of a current location/heading of the aircraft relative to the desired glide path, and/or a lateral deviation indicator 308 for providing awareness of a current location/heading of the aircraft relative to the centerline/extended centerline of the landing area 202 may also be included in the updated depiction 300. Further, said vertical deviation indicator 306 and/or said lateral deviation indicator 308 may be included in depictions in which the vertical reference graphical indicator 206, the horizontal reference graphical indicator 208, the extended graphical indicators 210, the panes 212, and the final approach curtain 214 are depicted, such as the depiction 200 shown in FIG. 2, for providing supplemental awareness of the aircraft's position relative to the approach path.

In exemplary embodiments, each depiction (200)/updated depiction (300) may include a current position indicator 250 for indicating a current position/location of the aircraft (as shown in FIGS. 2 and 3)

Figure 4:
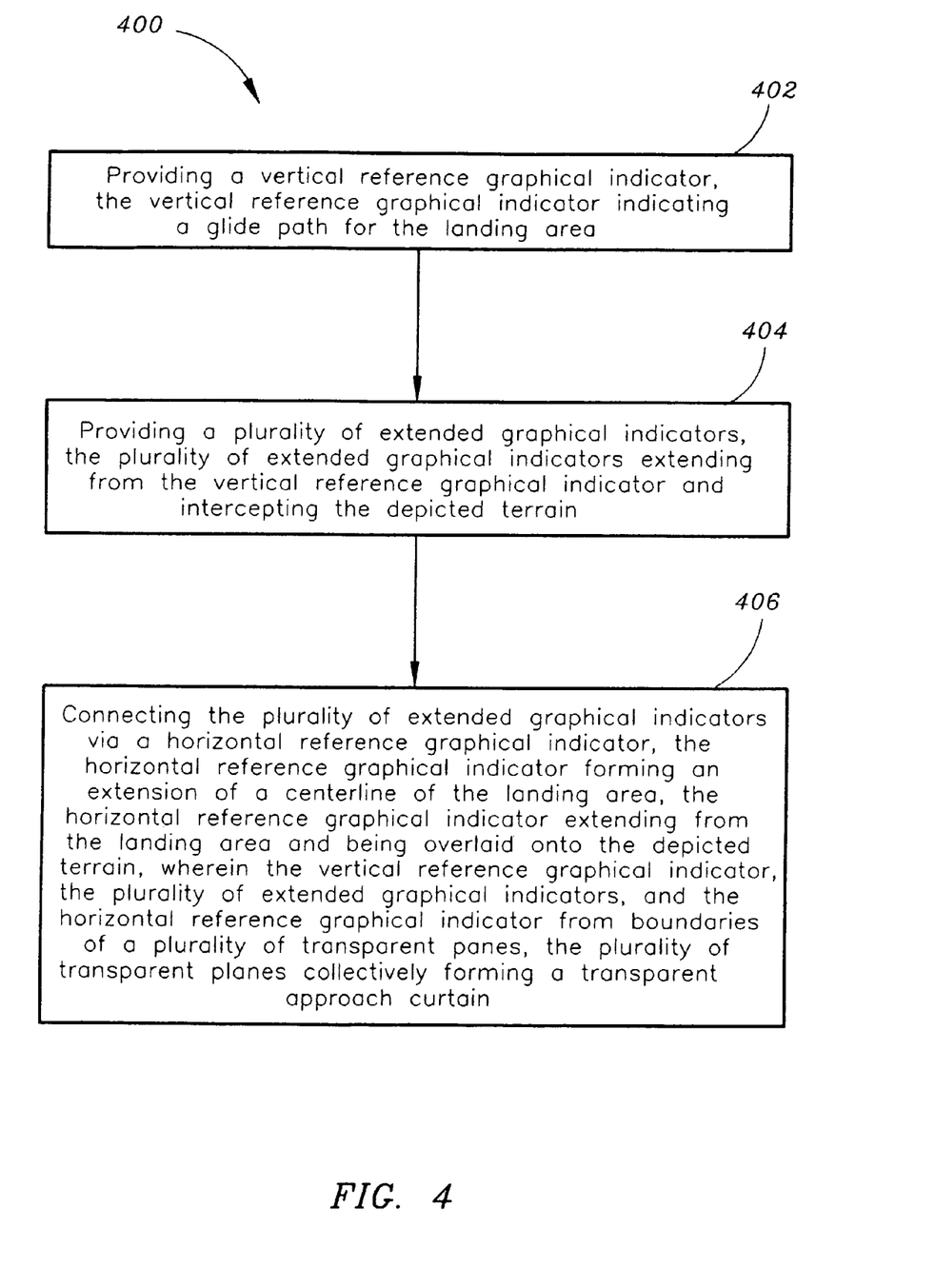
FIG. 4 is a flowchart illustrating a method for displaying providing a depiction of an approach path to a landing area and of terrain proximal to the landing area, the depiction being provided via a flight deck situational awareness system of an aircraft, in accordance with an exemplary embodiment of the present invention.

FIG. 4 is a flowchart illustrating a method for providing a depiction of an approach path to a landing area and of terrain proximal to the landing area, the depiction being provided via a flight deck situational awareness system of an aircraft in accordance with an alternative exemplary embodiment of the present invention. The method 400 may include providing a vertical reference graphical indicator 402. The vertical reference graphical indicator may indicate a glide path for the landing area. The method 400 may further include providing a plurality of extended graphical indicators 404. The plurality of extended graphical indicators may extend from the vertical reference graphical indicator and may intercept the depicted terrain. The method 400 may further include connecting the plurality of extended graphical indicators via a horizontal reference graphical indicator 406. The horizontal reference graphical indicator may form an extension of a centerline of the landing area. Further, the horizontal reference graphical indicator may extend from the landing area and may be overlaid onto the depicted terrain. In current embodiments of the present invention, the vertical reference graphical indicator, the plurality of extended graphical indicators, and the horizontal reference graphical indicator may form boundaries of a plurality of transparent panes, the plurality of transparent panes collectively forming a transparent approach curtain.

In exemplary embodiments of the present invention, the method 400 may further include providing a vertical deviation indicator, a horizontal deviation indicator, and a current position indicator in the depiction 408. The method 400 may further include, when the aircraft navigates within a threshold intercept angle for intercepting the approach path, updating the depiction by removing the vertical reference graphical indicator 410. The method 400 may further include, when the aircraft navigates within the threshold intercept angle for intercepting the approach path, updating the depiction by replacing the plurality of extended graphical indicators with a centerline awareness trail, the centerline awareness trail including a plurality of a markers, each marker corresponding to an extended graphical indicator-terrain interception location 412. The method 400 may further include, when a portion of the vertical reference graphical indicator intercepts the terrain, providing said portion of the vertical reference graphical indicator as a dashed line 414.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing a depiction of a landing area and of terrain proximal to the landing area via a flight deck situational awareness system of an aircraft, comprising:
   using a computer or processor to perform the steps of:
   when the aircraft is located beyond a threshold intercept angle for intercepting a prescribed approach path to the landing area:
      providing a vertical reference graphical indicator, the vertical reference graphical indicator indicating a prescribed glide path the prescribed glide path being a recommended angle of descent for the aircraft for causing the aircraft to land in the landing area, the prescribed glide path being an element of the prescribed approach path;
      providing a plurality of extended graphical indicators, the plurality of extended graphical indicators extending from the vertical reference graphical indicator and intercepting the depicted terrain; and
      connecting the plurality of extended graphical indicators via a horizontal reference graphical indicator, the horizontal reference graphical indicator forming an extension of a centerline of the landing area, the horizontal reference graphical indicator extending from the landing area and being overlaid onto the depicted terrain, wherein the vertical reference graphical indicator, the plurality of extended graphical indicators, and the horizontal reference graphical indicator form boundaries of a plurality of transparent panes, the plurality of transparent panes collectively forming a transparent approach curtain, the transparent approach curtain providing a graphical indication of the prescribed approach path and a graphical indication of a proximity of the aircraft to intercepting the prescribed approach path; and
   when the aircraft navigates within a threshold intercept angle for intercepting the approach path, updating the depiction by removing the vertical reference graphical indicator and replacing the plurality of extended graphical indicators with a centerline awareness trail, the centerline awareness trail including a plurality of a markers, each marker corresponding to an extended graphical indicator-terrain interception location.

2. A method as claimed in claim 1, further comprising:
   providing a vertical deviation indicator, a horizontal deviation indicator and a current position indicator in the depiction.

3. A method as claimed in claim 1, wherein the vertical reference graphical indicator, the horizontal reference graphical indicator and the extended graphical indicators are solid lines.

4. A method as claimed in claim 1, further comprising:
   when a portion of the vertical reference graphical indicator intercepts the terrain, providing said portion of the vertical reference graphical indicator as a dashed line.

5. A method as claimed in claim 1, wherein the landing area is a landing zone of a runway.

6. A non-transitory computer-readable medium having computer-executable instructions for performing a method for providing a depiction of a landing area and of terrain proximal to the landing area, the depiction being provided via a flight deck situational awareness system of an aircraft, said method comprising:
   when the aircraft is located beyond a threshold intercept angle for intercepting a prescribed approach path to the landing area:
      providing a vertical reference graphical indicator, the vertical reference graphical indicator indicating a prescribed glide path the prescribed glide path being a recommended angle of descent for the aircraft for causing the aircraft to land in the landing area, the prescribed glide path being an element of the prescribed approach path;
      providing a plurality of extended graphical indicators, the plurality of extended graphical indicators extending from the vertical reference graphical indicator and intercepting the depicted terrain; and
      connecting the plurality of extended graphical indicators via a horizontal reference graphical indicator, the horizontal reference graphical indicator forming an extension of a centerline of the landing area, wherein the vertical reference graphical indicator, the plurality of extended graphical indicators, and the horizontal reference graphical indicator form boundaries of a plurality of transparent panes, the plurality of transparent panes collectively forming a transparent approach curtain, the transparent approach curtain providing a graphical indication of the prescribed approach path and a graphical indication of a proximity of the aircraft to intercepting the prescribed approach path.

7. A non-transitory computer-readable medium having computer-executable instructions for performing a method as claimed in claim 6, said method further comprising:
   when the aircraft navigates within a threshold intercept angle for intercepting the approach path, updating the depiction by removing the vertical reference graphical indicator.

8. A non-transitory computer-readable medium having computer-executable instructions for performing a method as claimed in claim 7, said method further comprising:
   when the aircraft navigates within the threshold intercept angle for intercepting the approach path, updating the depiction by replacing the plurality of extended graphical indicators with a centerline awareness trail, the centerline awareness trail including a plurality of a markers, each marker corresponding to an extended graphical indicator-terrain interception location.

9. A non-transitory computer-readable medium having computer-executable instructions for performing a method as claimed in claim 6, wherein the vertical reference graphical indicator, the horizontal reference graphical indicator and the extended graphical indicators are solid lines.

10. A non-transitory computer-readable medium having computer-executable instructions for performing a method as claimed in claim 6, said method further comprising: when a portion of the vertical reference graphical indicator intercepts the terrain, providing said portion of the vertical reference graphical indicator as a dashed line.

11. A non-transitory computer-readable medium having computer-executable instructions for performing a method as claimed in claim 6, wherein the landing area is a landing zone of a runway.

12. A non-transitory computer-readable medium having computer-executable instructions for performing a method as claimed in claim 6, wherein the glide path is a prescribed nominal glide path for the landing area.

13. A flight deck situational awareness system for displaying a depiction of a landing area and of terrain proximal to the landing area for an aircraft, the system comprising:
- a memory configured for storing aircraft navigation information for the aircraft;
- a processor configured for being communicatively coupled with the memory and further configured for receiving the aircraft navigation information stored in the memory, the processor being further configured for generating the depiction based upon the aircraft navigation information; and
- a display configured for being communicatively coupled with the processor, the display being further configured for receiving the depiction from the processor and for displaying the depiction,
- wherein the depiction includes an approach curtain when the aircraft is located beyond a threshold intercept angle for intercepting a prescribed approach path to the landing area, the approach curtain including: a vertical reference graphical indicator for indicating a prescribed glide path, the prescribed glide path being a recommended angle of descent for the aircraft for causing the aircraft to land in the landing area, the prescribed glide path being an element of the prescribed approach path; a plurality of extended graphical indicators which extend from the vertical reference graphical indicator and intercept the depicted terrain; a horizontal reference graphical indicator for connecting the extended graphical indicators and forming an extension of a centerline of the landing area, the vertical reference graphical indicator, the plurality of extended graphical indicators, and the horizontal reference graphical indicator forming boundaries of a plurality of transparent panes which form the approach curtain, the transparent approach curtain providing a graphical indication of the prescribed approach path and a graphical indication of a proximity of the aircraft to intercepting the prescribed approach path.

14. A system as claimed in claim 13, wherein the depiction is one of a Synthetic Vision System (SVS) depiction and an Enhanced Vision System (EVS) depiction.

15. A system as claimed in claim 13, wherein aircraft navigational information for the aircraft includes positional information for the aircraft, performance information for the aircraft, navigational environment information for the aircraft, approach path information, landing area information, and terrain information.

16. A system as claimed in claim 15, wherein the system is further configured for dynamically updating the depiction in real time based upon updated aircraft navigation information for the aircraft.

17. A system as claimed in claim 15, wherein updating the depiction includes replacing the approach curtain with a centerline awareness trail when the aircraft navigates within a threshold intercept angle for intercepting the approach path.

\* \* \* \* \*